E. S. MERRIAM.
RECOVERY OF GASOLENE FROM NATURAL GAS, &c.
APPLICATION FILED OCT. 30, 1917.
1,304,587.
Patented May 27, 1919.
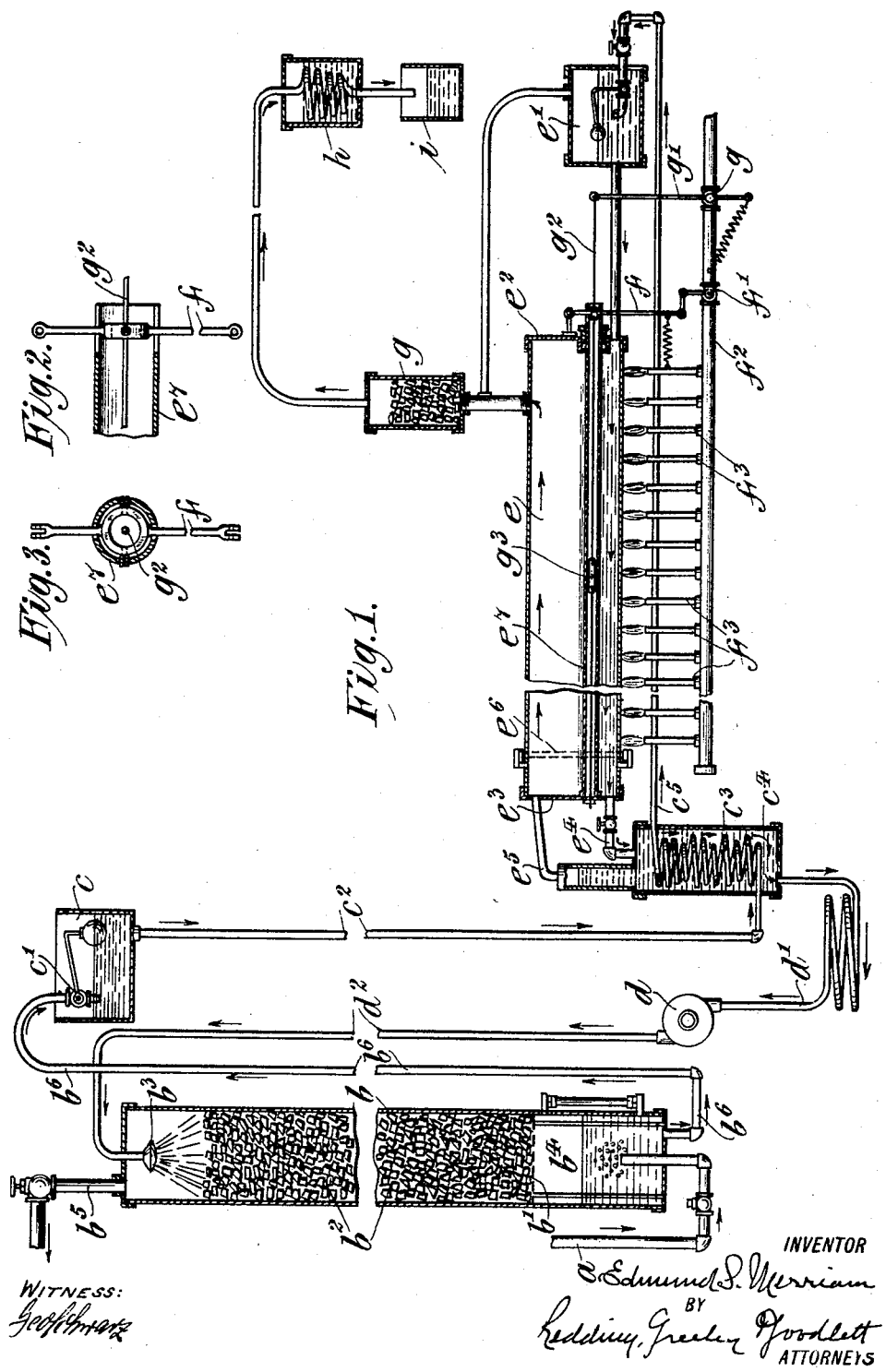
WITNESS:
INVENTOR
Edmund S. Merriam
BY
Redding, Greeley & Goodlett
ATTORNEYS

UNITED STATES PATENT OFFICE.

EDMUND S. MERRIAM, OF MARIETTA, OHIO.

RECOVERY OF GASOLENE FROM NATURAL GAS, &c.

1,304,587.   Specification of Letters Patent.   Patented May 27, 1919.

Application filed October 30, 1917. Serial No. 199,223.

*To all whom it may concern:*

Be it known that I, EDMUND S. MERRIAM, a citizen of the United States, and a resident of Marietta, in the State of Ohio, have invented certain new and useful Improvements in the Recovery of Gasolene from Natural Gas, &c., of which the following is a specification, reference being had to the accompanying drawing, forming a part hereof.

This invention is particularly concerned with the separation of the gasolene content from the absorbent menstruum in which the desired volatile constituents have been absorbed from the gas by some kind of absorption process, although it is capable of application to other industrial processes of a similar character. The absorbent menstruum usually employed is an oil which is made to absorb the desired elements from the gas by contact therewith. In other methods of separation of these desirable constituents, the oil with the absorbed constituents, is discharged into a steam still in which the charged oil is subject to the action of steam which heats the oil and removes the gasolene as vapor. The steam and gasolene vapor are carried over from the boiler through a suitable condenser in which the steam and vapor are liquefied, the separation of the liquid gasolene from the water condensation being thereafter easily effected. The oil, from which the gasolene constituents have been separated, and the water are separated in the boiler and the oil is drawn off to be used again. The employment of steam necessitates constant supervision by one or more operatives and the process, though generally satisfactory in other respects, is expensive. The charged oil is, synthetically, the equivalent of crude oil, which is known to be a complex mixture, from which, in a distillation process, volatile matters are given off at different temperatures. When such a complex mixture is subjected to a distillation process of the ordinary type, it is necessary to continue the distillation until all of the desired constituents are driven off, then to remove the liquid which remains in the still, and then to introduce more of the charged liquid to be subjected to the distillation process. During the distillation the temperature may rise, but at any given instant the temperature is approximately the same at all points in the body of liquid, and the operation must be continued, with the same body of charged oil, until all of the gasolene constituents have been driven off. It is the object of the present invention to improve the method of and the apparatus for the separation of the gasolene constituents or other condensable vapors from the charged oil, to the end that the process may be carried on more advantageously and economically (in that it is safer, requires less fuel and yields a product which requires no further treatment) and in a continuous, automatic or self-controlled manner, the constant attention of an operative being unnecessary. In accordance with the invention the distillation of the charged oil is carried on by the external application of dry heat, the flowing oil being progressively heated so that the gasolene constituents or other condensable vapors which can be driven off at a low heat are driven off from the flowing oil at one point, while the gasolene or other constituents which can be driven off only at a higher temperature are so driven off simultaneously with the constituents which are first driven off, but at a later point in the flow, all of the constituents being gathered and conducted together into a rectifier, if one be needed in addition to the still itself, which acts as a rectifier, and then into a condenser in which the condensation into liquid form takes place. The invention will be more fully explained hereinafter with reference to the accompanying drawing in which Figure 1 illustrates, partly in section and partly in a somewhat conventional way, an apparatus in which the invention may be practised, parts being broken out to save space. Fig. 2 is a detail view of the end of the thermostatic tube showing it in longitudinal section, and Fig. 3 is an end view of the same.

As the separation of the gasolene or other constituents from the charged liquid usually follows immediately and in a continuous apparatus the absorption of the constituents from the gas by the oil, which is continuously used over again, the apparatus in which the absorption is carried on and its mode of operation will be described briefly.

The gas which carries the gasolene or other constituents to be recovered, whether it is casing head gas or dry natural gas, or artificial gas, or air containing condensable vapors to be recovered, is delivered from its source of supply, through a pipe *a*, to an absorber *b* which, as usually constructed, is a tower or vertical tank with a perforated diaphragm or floor $b'$ to support a body $b^2$ of coke or other suitable material. The oil to be charged is delivered at the upper end of the absorber through a suitable rose $b^3$ and trickles down through a body of coke in a counter-current against the gas which bubbles through the oil in the chamber $b^4$ at the bottom of the absorber and rises through the body of coke. The gas which is not absorbed by the oil passes off through a pipe $b^5$ to a place of use or storage. The charged oil, which accumulates to a greater or less extent in the chamber $b^4$, is delivered therefrom continuously through a pipe $b^6$.

Preferably the charged oil is delivered to a blow-off tank $c$, under the control of a float valve $c'$, which may be placed at any convenient point with respect to the absorber, but preferably somewhat above the chamber $b^4$. The charged oil is delivered to the blow-off tank by the pressure of the gas within the tank upon the surface of the oil in the chamber $b^4$, and only so much gas pressure is required as may be necessary to drive the gas through the absorber and to deliver the charged oil to the blow-off tank. The purpose of the blow-off tank is to permit the less condensable gases to separate from the oil at atmospheric pressure and thereby prevent the trouble which might be caused during condensation if these lighter gases were allowed to dilute the gasolene vapor.

The oil from which the desirable constituents are removed by the distillation process, to be described, may be returned from the still to the absorber by a suitable pump with pipe connections $d'$ and $d^2$ from the still to the rose $b^3$.

The charged oil from the blow-off tank may be delivered by the pipe $c^2$ to a coiled pipe $c^3$ in a preheater or heat exchanger $c^4$, in which the hot oil from the still gives up its heat to the cool, charged oil. From the preheater or heat exchanger, the charged oil, under a suitable pressure or head which may be created by suitable elevation of the blow-off tank $c$, passes by a pipe $c^5$ to the still $e$, the volume of the oil within the still being controlled by the regulator $e'$ of usual or suitable character. The still $e$ consists of a long, unobstructed, uni-chambered closed vessel which is comparatively shallow and substantially horizontal. It may be formed of a length of pipe of suitable diameter, provided with heads $e^2$, $e^3$. It has been found that a ratio of length to diameter of about twenty to one gives satisfactory results. This vessel receives the charged oil at its end remote from the preheater and may discharge the oil, after the separation of the gasolene constituents therefrom, through a discharge pipe $e^4$ into the preheater or heat exchanger $c^4$. The latter may also be connected with the upper part of the still through a pipe $e^5$ for the purpose of equalizing the pressures and permitting the return to the still of any vapors which might be carried over with the oil into the heat exchanger and there set free. The still may be provided with the usual gage glass $e^6$ and is also provided, preferably, with a thermostatic rod or tube $e^7$ by means of which and the valve arm $f$ of the valve $f'$ the temperature within the still may control the supply of fuel gas through a pipe $f^2$. The latter is preferably provided with a longitudinal series of burners $f^3$ so that the charged oil, which flows continuously through the still $e$, shall be heated gradually and progressively without danger of cracking or carbonizing or otherwise having its character substantially changed except for the separation of the condensable vapors, receiving its first heating as it enters the still and being discharged from the still at its highest temperature. In addition to the fuel regulating valve $f'$, there may also be provided an emergency cut-off for the fuel which, as shown, may comprise a spring-operated valve $g$, the arm $g'$ of which is held normally against movement by a wire $g^2$, extended through the tube $e^7$ and having a fusible link $g^3$, so that if the temperature in the still rises above a predetermined degree the wire will part and the valve be closed by its spring.

The shape of the still should be such as to permit the flow of oil through it in a stream or current, so that the progressive heating of the oil shall be accomplished, the more volatile constituents being driven off first and the less volatile constituents being driven off as the oil progresses through the still. It is found that in this way the operation is carried on most advantageously and economically in a continuous manner, without interruptions, and that when the process has once begun it will be thereafter self-controlling so that not only will the constant attention of an operative be unnecessary but the operation can be continued without danger, for if the temperature of the still increases to a dangerous degree, the supply of heat may be cut off completely and if the quantity of oil within the still increases to an undesirable extent the further delivery of oil thereto and therefore the further flow of oil through the entire apparatus will be prevented.

The gasolene constituents which are driven off from the oil in the still are gathered in the upper part of the still and may be discharged therefrom through a rectifier $g$ and thence through a condenser $h$ from which the liquid gasolene may be delivered into a suitable receptacle $i$. It will be noted that the progressive still itself acts as a rectifier or dephlegmator since the too heavy vapors which may be released at the hottest end of the still will be cooled and they travel toward the cooler end of the still and condensed and thereby prevented from being carried over with the gasolene vapors.

The mode of practising the new method as well as the mode of operation of the apparatus employed will be understood readily without further explanation. It will be obvious that the operation can be carried out with different forms of apparatus suited to different conditions and that the invention is not restricted to the particular form of apparatus shown and described herein and is capable of a wide range of application.

I claim as my invention.

1. The method of recovering condensable vapors from gas, which consists in causing the vapors to be absorbed by oil, causing the charged oil to flow continuously and freely in a substantially horizontal direction in a relatively shallow and narrow stream of such length that the oil at the outlet end may be maintained at a materially higher temperature than at the inlet end, applying heat externally to the stream of oil uniformly throughout its length, to heat the oil gradually and progressively as it flows, withdrawing the vapors, cooling the oil and causing the cooled oil to reabsorb vapors from other gas and to be returned for further treatment in like manner.

2. The method of recovering condensable vapors from gas, which consists in causing the vapors to be absorbed by oil, causing the charged oil to flow continuously and freely in a substantially horizontal direction in a relatively shallow and narrow stream of such length that the oil at the outlet end may be maintained at a materially higher temperature than at the inlet end, applying heat externally to the stream of oil uniformly throughout its length to heat the oil gradually and progressively as it flows, causing the vapors to flow over the stream of oil in a direction opposite to the flow of the oil, withdrawing the vapors, cooling the oil and causing the cooled oil to reabsorb vapors from other gas to be returned for further treatment in like manner.

3. In an apparatus for separating condensable vapors from a liquid menstruum without substantially changing the character of the menstruum except for the withdrawal of such vapors, the combination of a relatively long, narrow, unobstructed, uni-chambered still, means to supply the menstruum thereto at one end continuously, means to withdraw the menstruum therefrom at the other end continuously, means to regulate the supply of the menstruum so as to maintain a constant level in the still, means to withdraw the vapors from the still, and a longitudinal series of burners beneath the still to heat the menstruum gradually and progressively in its passage through the still.

4. In an apparatus for separating condensable vapors from a liquid menstruum without substantially changing the character of the menstruum except for the withdrawal of such vapors, the combination of a relatively long, narrow, unobstructed, uni-chambered still, means to supply the menstruum thereto at one end continuously, means to withdraw the menstruum therefrom at the other end continuously, means to regulate the supply of the menstruum so as to maintain a constant level in the still, means to equalize the pressure in the still and in said regulating means, means to withdraw the vapors from the still, and a longitudinal series of burners beneath the still to heat the menstruum gradually and progressively in its passage through the still.

5. In an apparatus for separating condensable vapors from a liquid menstruum without substantially changing the character of the menstruum except for the withdrawal of such vapors, the combination of a relatively long, narrow, unobstructed, uni-chambered still, means to supply the menstruum thereto at one end continuously, means to withdraw the menstruum therefrom at the other end continuously, means to withdraw the vapors from the still, a longitudinal series of burners beneath the still to heat the menstruum gradually and progressively in its passage through the still, and thermostatic devices operated by the temperature in the still to control the heat.

This specification signed this 19" day of October, 1917.

EDMUND S. MERRIAM.